United States Patent
Bousfield, III et al.

(10) Patent No.: US 7,599,818 B2
(45) Date of Patent: Oct. 6, 2009

(54) CONTROL AND DIAGNOSTICS OF POWER DELIVERY SYSTEM

(75) Inventors: John Channing Bousfield, III, Murrysville, PA (US); Albert Roc, Pittsburgh, PA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 504 days.

(21) Appl. No.: 11/515,292

(22) Filed: Aug. 31, 2006

(65) Prior Publication Data

US 2007/0055902 A1    Mar. 8, 2007

Related U.S. Application Data

(60) Provisional application No. 60/714,093, filed on Sep. 2, 2005.

(51) Int. Cl.
    *G06F 19/00* (2006.01)
(52) U.S. Cl. .................................. 702/185; 700/292
(58) Field of Classification Search ................. 702/185, 702/182–184, 188; 700/292, 293, 294, 295, 700/296, 297, 298
    See application file for complete search history.

(56) References Cited

U.S. PATENT DOCUMENTS

| 4,527,226 | A | 7/1985 | Glennon |
|---|---|---|---|
| 4,864,487 | A * | 9/1989 | Schnetzka et al. ........... 363/129 |
| 5,036,451 | A | 7/1991 | Rozman et al. |
| 5,625,545 | A | 4/1997 | Hammond |
| 5,812,557 | A | 9/1998 | Stewart et al. |
| 6,313,600 | B1 | 11/2001 | Hammond et al. |
| 6,411,530 | B2 | 6/2002 | Hammond et al. |
| 2005/0030045 | A1 | 2/2005 | Deng et al. |

FOREIGN PATENT DOCUMENTS

| WO | WO 01/31770 A1 | 5/2001 |
|---|---|---|
| WO | WO 03/003551 A2 | 1/2003 |

* cited by examiner

*Primary Examiner*—Edward Raymond
(74) *Attorney, Agent, or Firm*—Michael J. Wallace

(57) ABSTRACT

A method of monitoring a power delivery system includes receiving a gating signal packet from a power cell or other component of the power delivery system. The received packet includes bits that correspond to the status of one or more devices within the component. The packet also includes one or more bits that contain a subset of stored data that was retrieved from a component memory. Optionally, the method also may include repeating the receiving until multiple gating signal packets are received. The multiple gating signal packets collectively contain the stored data, so that the subsets of the data point may be assembled into the stored data. Optionally, the one or more bits that contain a subset of stored data may be mode bits of the gating signal packet.

19 Claims, 5 Drawing Sheets

PRIOR ART

310

| ENABLE RIGHT POLE | ENABLE LEFT POLE | TEMP SYNC | ENABLE CELL BYPASS | MODE 0 | MODE 1 | ENABLE OUTPUT | PARITY |
|---|---|---|---|---|---|---|---|
| 311 | 312 | 313 | 314 | 315 | 316 | 317 | 318 |

| POWER SUPPLY VALID | BYPASS ENABLED | TEMP FEED | PHASE LOSS | FAULT | MODE 0 | MODE 1 | PARITY |
|---|---|---|---|---|---|---|---|
| 351 | 352 | 353 | 354 | 355 | 356 | 357 | 358 |

FIG. 3B

CONTROL AND DIAGNOSTICS OF POWER DELIVERY SYSTEM

CROSS-REFERENCE TO RELATED APPLICATIONS

This patent application claims priority to, and incorporates by reference in its entirety, pending U.S. Provisional Patent Application No. 60/714,093, entitled "A system and method for enhanced control and diagnostics of power cells provided within a multi-level drive," filed Sep. 2, 2005.

STATEMENT REGARDING FEDERALLY SPONSORED RESEARCH

Not applicable.

NAMES OF PARTIES TO A JOINT RESEARCH AGREEMENT

Not applicable.

INCORPORATION BY REFERENCE OF MATERIAL ON DISK

Not applicable.

BACKGROUND

A power supply to control the flow of energy between a first alternating current (AC) system and a second AC system is required in a variety of commercial and industrial applications, such as the control of AC motor operation. Some such power supplies convert the energy from a first frequency and voltage to a second frequency and voltage. One way to implement such a system is with one or more power cells that include two solid state converters with an intermediate DC link. A power cell is an electrical device that has a three-phase alternating current input and a single-phase alternating current output. One such system is described in U.S. Pat. No. 5,625,545 to Hammond, the disclosure of which is incorporated herein by reference in its entirety. Referring to FIG. 1 herein, Hammond discloses a power cell 110 that includes an AC-to-direct current (DC) converter 112—here, a three-phase diode-bridge rectifier—one or more DC capacitors 114, and a DC-to-AC converter 116—here, an H-bridge inverter. The rectifier 112 converts the input 118 AC voltage to a substantially constant DC voltage that is supported by the capacitors 114 that are connected across the rectifier 112 output. The output stage of the inverter 110 includes an H-bridge inverter 116 that includes two poles, a left pole and a right pole, each with two devices. The inverter 110 transforms the DC voltage across the DC capacitors 114 to an AC output 120 using pulse-width modulation (PWM) of the semiconductor devices in the H-bridge inverter 116. In some embodiments, the rectifier 112 may include three pairs of current-controlling devices, such as insulated gate bipolar transistors (IGBTs), diodes, switches or other devices. In some embodiments, the inverter 116 may contain two pairs of such devices.

A circuit including power cells such as 110 in FIG. 1, when connected to a load, such as a motor, can provide power from an input source to the motor when operating in the motoring mode. Such a power cell may sometimes be referred to as a unidirectional or two-quadrant (2Q) cell. However, when the motor speed needs to be reduced, power from the motor needs to be absorbed by the inverter. This mode of operation, when power must be absorbed by the inverter, is referred to as the regeneration mode. In such situations, some or all of the power cells are typically regenerative or four-quadrant (4Q) cells.

In the prior art, the ability to diagnose and predict failure of one or more cells has been limited. The disclosure contained herein describes attempts to solve this problem.

SUMMARY

In an embodiment, a method of monitoring a power delivery system includes receiving a gating signal packet from a component of a power delivery system. The received packet includes bits that correspond to the status of one or more devices within the component. The packet also includes one or more bits that contain a subset of stored data that was retrieved from a component memory. Optionally, the method also may include repeating the receiving until multiple gating signal packets are received. The multiple gating signal packets collectively contain the stored data, so that the subsets of the data point may be assembled into the stored data. Optionally, the one or more bits that contain a subset of stored data may be mode bits of the gating signal packet.

The method also may include first delivering a gating signal packet to the component before the receiving. The delivered packet includes a plurality of bits that command operation of one or more devices within the component. The packet includes one or more bits that contain a subset of a command to request the data point.

The method may include repeating the delivering until multiple gating signal packets are delivered, wherein the multiple gating signal packets collectively contain the command, so that the subsets of the command can be assembled into the command. The method may further include using the assembled stored data to determine a component fault diagnosis. The packets also may include bits corresponding to data that is predictive of failure of a component, and the method also may include delivering a control command to the power cell based on the predictive data.

The stored data may include fault data such as a fault code, a time code or a device identifier. The stored data may include waveform information such as current data, voltage data, temperature data, or phase data.

In an alternate embodiment, a method of operating a power cell includes receiving a gating signal packet from a power cell. The received packet includes bits that correspond to the status of one or more devices within the cell, and the packet also includes one or more bits that contain a subset of stored data that was retrieved from a cell memory. The receiving of additional packets occurs until multiple gating signal packets that collectively contain the stored data are received. The method then includes assembling the subsets of the data point into the stored data. Before the receiving, the method may include delivering a gating signal packet to the power cell. The delivered packet may include bits that command operation of one or more devices within the cell, and the packet may includes one or more bits that contain a subset of a command to request the data point. The delivering may be repeated until multiple gating signal packets that collectively contain the command are delivered. The method may then include assembling the subsets of the command into the command.

In an alternate embodiment, a method of operating a power cell includes delivering a gating signal packet to a power cell. The delivered packet includes a plurality of bits that command operation of one or more devices within the cell. The packet also includes one or more bits that contain a subset of a command to request a data point. The delivering is repeated until a plurality of gating signal packets are delivered, wherein the plurality of gating signal packets collectively contain the command. The method may then include assembling the subsets of the command into the command. The method also may include receiving a gating signal packet from the power cell in response to the command, wherein the received packet includes a plurality of bits that correspond to the status of one or more devices within the cell. The packet also may include one or more bits that contain a subset of stored data that was retrieved from a cell memory. The receiving may be repeated until a plurality of gating signal packets are received, wherein the plurality of received gating signal packets collectively contain the stored data. The method may then include assembling the subsets of the stored data into the stored data.

BRIEF DESCRIPTION OF THE DRAWINGS

FIGS. 3A and 3B illustrate data bits that may be included in exemplary gating signal packets delivered to and from a power cell, respectively.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. Further, the word "comprising" means "including but not limited to." Unless defined otherwise, all technical and scientific terms used herein have the same meanings as commonly understood by one of ordinary skill in the art.

Figure 1:
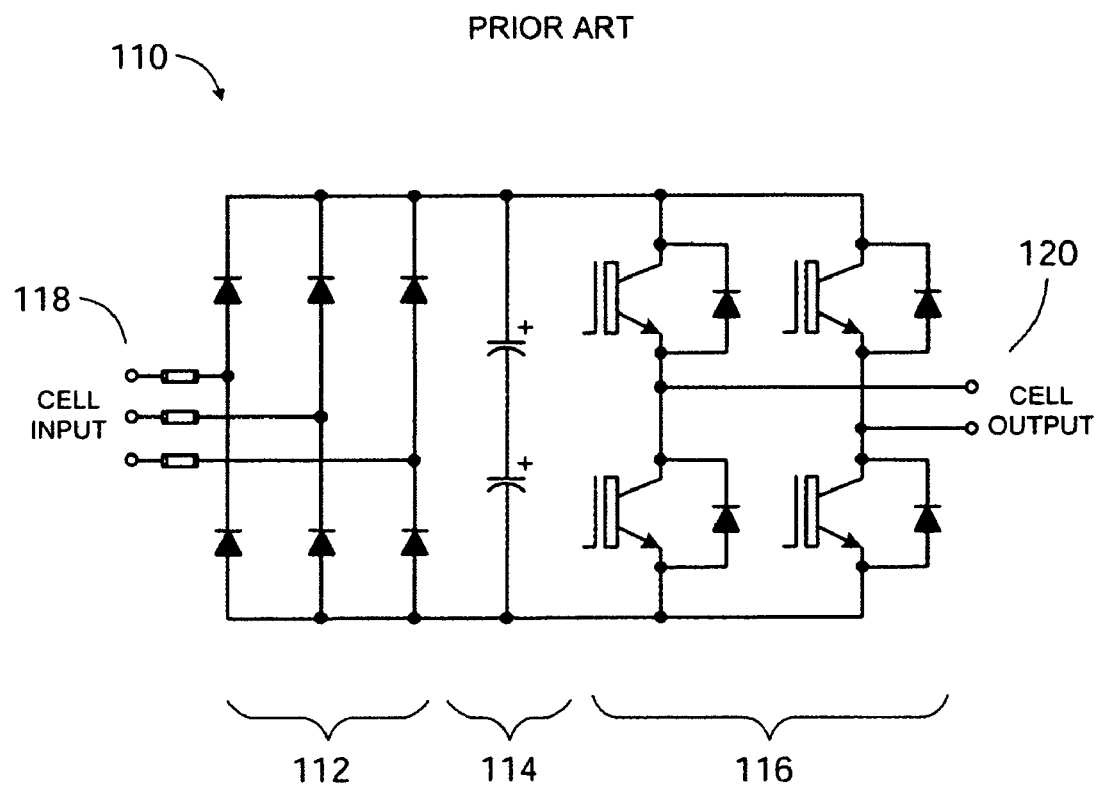
FIG. 1 is a circuit diagram showing exemplary characteristics of a prior art power cell.
Figure 2:
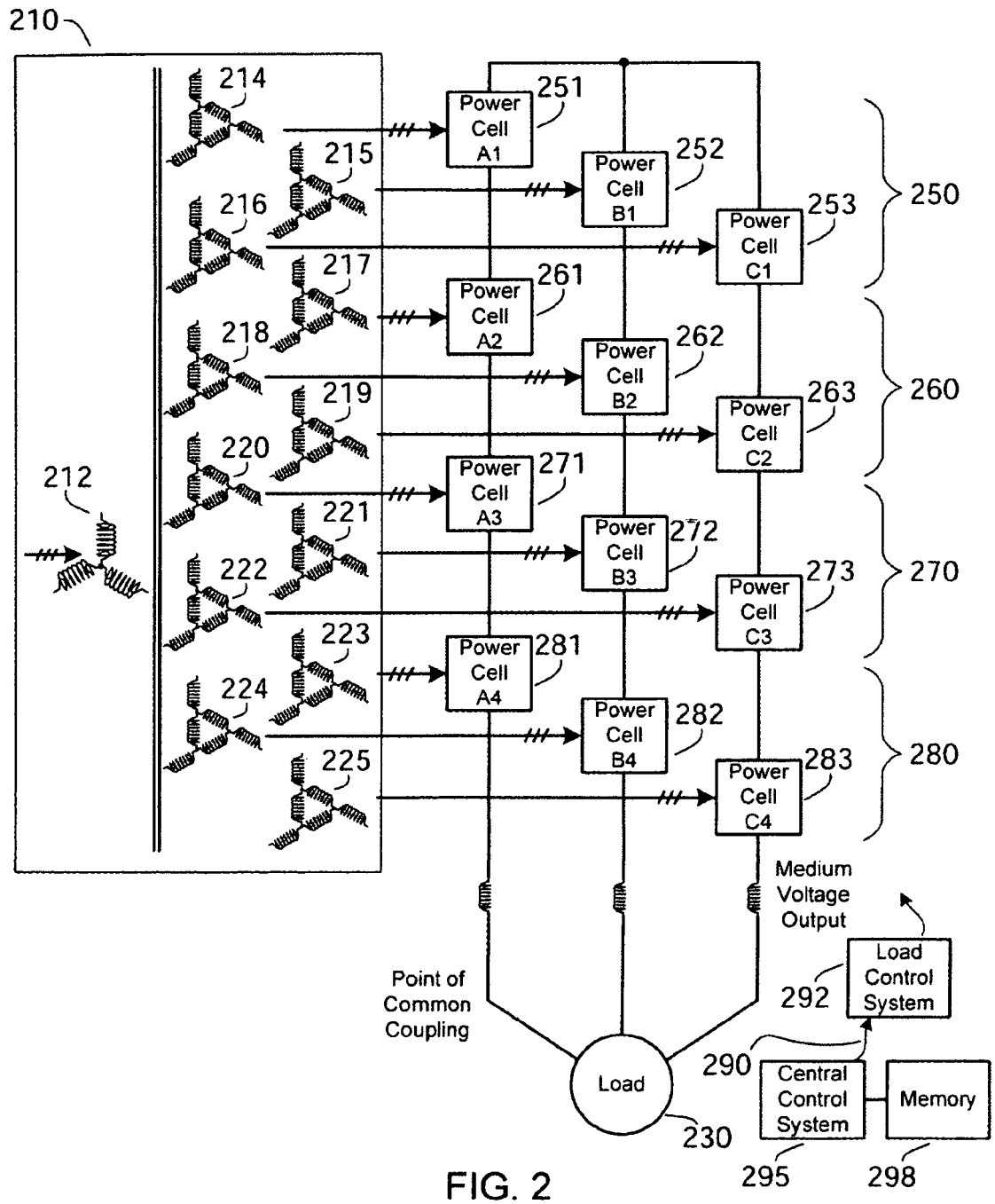
FIG. 2 depicts a circuit comprising a plurality of power cells connected to a load.

In various embodiments, a multi-level power circuit includes a plurality of power cells to drive a load. FIG. 2 illustrates an exemplary embodiment of a circuit having such power cells. In FIG. 2, a transformer 210 delivers three-phase, medium-voltage power to a load 230 such as a three-phase induction motor via an array of single-phase inverters (also referred to as power cells). The transformer 210 includes primary windings 212 that excite a number of secondary windings 214-225. Although primary winding 212 is illustrated as having a star configuration, a mesh configuration is also possible. Further, although secondary windings 214-225 are illustrated as having a mesh configuration, star-configured secondary windings are possible, or a combination of star and mesh windings may be used. Further, the number of secondary windings illustrated in FIG. 2 is merely exemplary, and other numbers of secondary windings are possible. The circuit may be used for medium voltage applications or, in some embodiments, other applications. As used herein, medium voltage means a rated voltage greater than 690 volts (V) and less than 69 kilovolts (kV). In some embodiments, medium voltage may include voltages between about 1000 V and about 69 kV.

Any number of three-phase sets of power cells may be connected between the transformer 210 and the load 230. Referring to FIG. 2, the system may include a first set of power cells 251-253, a second set of power cells 261-263, a third set of power cells 271-273, and a fourth set of power cells 281-283. Fewer than four sets, or more than four sets, are possible. A central control system 295 sends command signals to a local controller 292 and/or cell-level controls in each cell over fiber optics or another wired or wireless communications medium 290.

The modulation of each power cell in the system may be controlled using gating signals that are transmitted to each cell from the controller 295. A gating signal may be a two-pole signal that serves as an "on/off" signal or an "enable/disable" command to one or more devices in the cell. The signals originate from the controller 295 in order to reduce the harmonic content that is presented to the load by the signals. In addition, the cells may return a gating signal that acknowledges the fault status of a portion of the cell.

The size or number of bits in a gating signal, as well as the transmission speed of a gating signal may be limited by the bandwidth of the fiber, wire or wireless carrier that delivers the signals to and from the cell. Referring to FIG. 3A, an 8-bit gating command signal packet 310 delivered to a cell may include a fire (enable/disable) right pole bit 311 and a fire (enable/disable) left pole bit 312. One signal may be used per pair of IGBTs or other switches in the cell, and these bits may control the on/off status of each IGBT. The signal also may include a temperature synchronization bit 313, an enable cell bypass bit 314, two mode bits 315 and 316, an enable output bit 317, and a parity bit 318. In the prior art, the mode bits have been set to zero, and the mode bits were occasionally used to request information from a cell when the cell was powered off.

Referring to FIG. 3B, an 8-bit return signal packet 350 received by the central controller from a cell may include a power supply status or validity bit 351, cell bypass enabled bit 352, cell temperature feedback bit 353, cell phase loss bit 354, a fault bit that indicates whether or not a fault exists 355, two mode bits 356 and 357 that are normally zero, and a parity bit 358. In the prior art, the fault data provided by the return signal consisted solely of a "yes/no" indicator of whether or not a fault exists.

Figure 4:
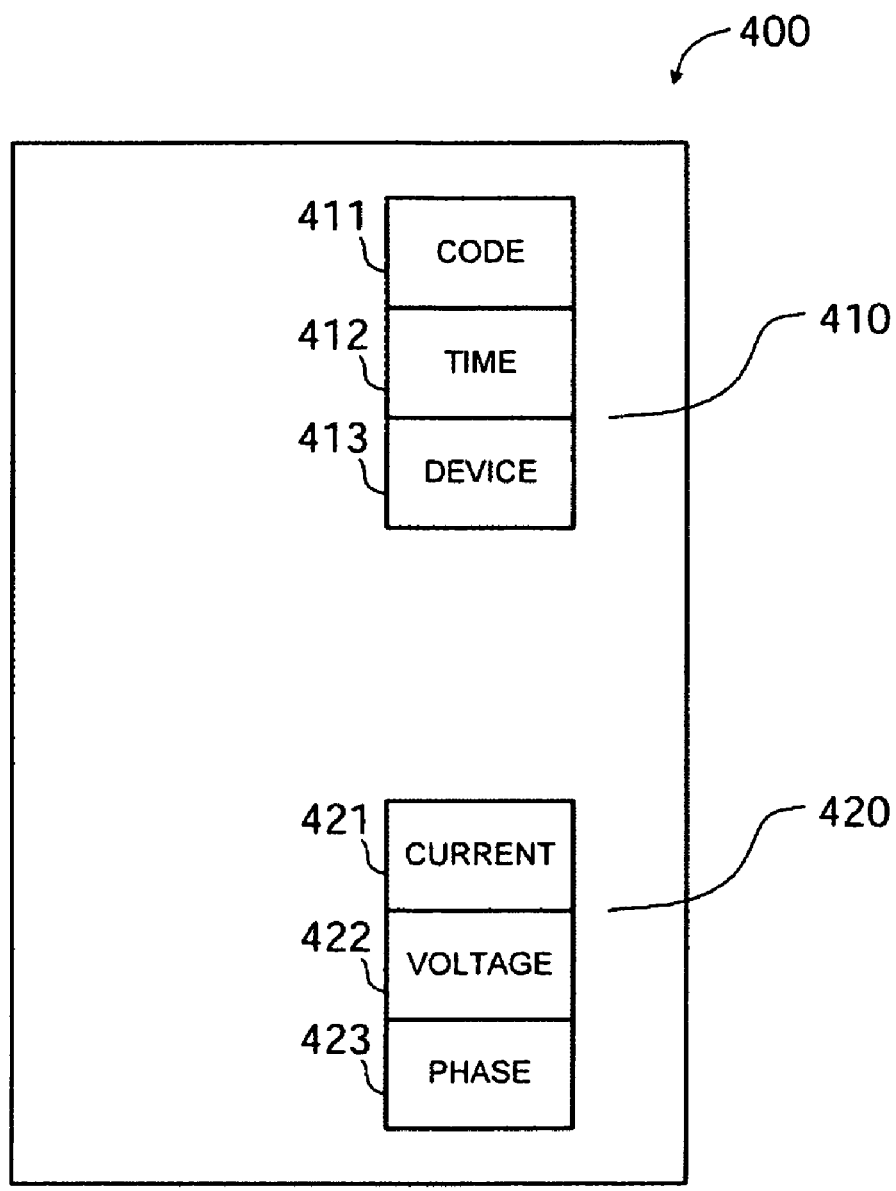
FIG. 4 illustrates exemplary fault and waveform data points that may be stored in a cell memory.

Referring to FIG. 4, in the embodiments described herein, some or all of the power cells 400 may include a memory portion, such as a non-volatile memory, that stores fault information to create a fault log 410 for the system. The fault information may include a fault code 411, and optionally a time stamp 412 and an indicator 413 of which device within the power cell is faulted. The fault code may be a multi-character code, such as a binary, numeric or alphanumeric code, that corresponds to a fault type. Examples of fault codes may include items such as: 0000100—DC over-voltage fault; 0010110—arc detected within the cell; and 0001101—loss of thermal sensor on right pole. The optional time stamp may relate to an actual time, or it may relate to a counter such that the time is related to a zero count on the counter. The memory holding the fault log may receive data from the cells within the device as soon as a fault occurs. The fault log may include data that helps to diagnose the cause and/or consequences of a fault. Fault log data may include, for example: current measurements at various points within the cell; voltage measurements at various points within the cell; frequency; voltage and current imbalance; DC ripple; and other data. Although not required, it is preferred that fault data be stored in non-volatile memory in order to create a permanent or semi-permanent record of fault data.

The cells also may include a memory portion, such as a volatile memory portion, that stores cell waveform data 420, such as current amplitude 421, voltage 422, and phase 423. This data may be captured on a real-time basis and stored in volatile memory so that older data is purged after a certain amount of newer waveform data is received. The amount of waveform data held in the memory may be limited by the size of the memory, the size of a buffer or cache, a predetermined setting, or any other factor.

In embodiments contemplated herein, the gating signals may be used to capture fault data from the fault log, such as a request for one or more data points from the fault log. In some embodiments, referring to FIG. 5, this may be done by the central controller by selecting a command 501 to provide certain fault information. The command may be a multi-bit command, that the method may include dividing the command 503 into subsets of bits and placing 505 each subset into an appropriate portion of the gating command signal packet, such as the two mode bits. If the placing has not placed all of the bits of the command into command signals, the process selects a next gating packet 507 and repeats the process until the command has been fully placed among a group of gating signal packets. When the command has been divided and the packets have been delivered, the command is assembled 509 at the cell or the local control. Thus, although two mode bits of a single packet may not be sufficient to provide the whole command, the command may be split between multiple successive or multiplexed gating signal packets so that when a set of packets is received by the cell, the cell may extract and assemble the command from multiple gating signal packets. For example, a 16-bit command may be divided among 8 gating signal packets, and the command is assembled when all of the 8 gating signal packets are received by cell or local control. As another example, a 16-bit command may be divided among 16 gating signal packets, with one mode bit of each gating signal including a bit of the command. In such situations, it may be desirable to also provide each command with a $17^{th}$ packet for synchronization. In addition, multiple commands may be assembled into a packet of information.

The system may then return the requested data to the central controller by a similar process that includes dividing the data 511 into subsets, distributing 513 the data into the two mode bits or another appropriate portion of multiple gating signals, repeating 515 the process until the data has been fully delivered, and assembling the data 517 at the central controller or another appropriate device. For example, a 16-bit data point may be divided among 17 gating signal packets (16 packets having one mode bit each plus one packet for synchronization) or 8 (two mode bits each) gating signal packets, and the data point may be assembled with all of the 17 or 8 gating signal packets are received by the central control.

In some embodiments, some or all of the fault and/or waveform data points may be automatically delivered to the central controller at predetermined time, count, or other intervals. Alternatively, some or all of the fault and/or waveform data points may be delivered to the central controller in response to specific requests. The data points may be delivered in any appropriate manner, such as multiplexed or simply "round robin" so that when one set of packets that collectively contain a data point is fully delivered, the next data point may be delivered in a subsequent set of packets. The requests may be transmitted and data points returned while the cell is operating so that shutdown of the cell is not needed for data gathering purposes.

Thus, with a process such as that described above, the central controller may receive much more information about a fault than simply an indicator of whether a fault has occurred. For example, the information may include a fault time (time stamp), an indicator of the device that faulted, and a fault code. In addition, the other information included with the gating signal, such as cell temperature and input voltage as shown in FIG. 3B, may provide data that is predictive of a fault. Predictive data may be used to automatically shut down the cell, bypass a cell, or take other appropriate action to prevent the occurrence of a fault.

Figure 5:
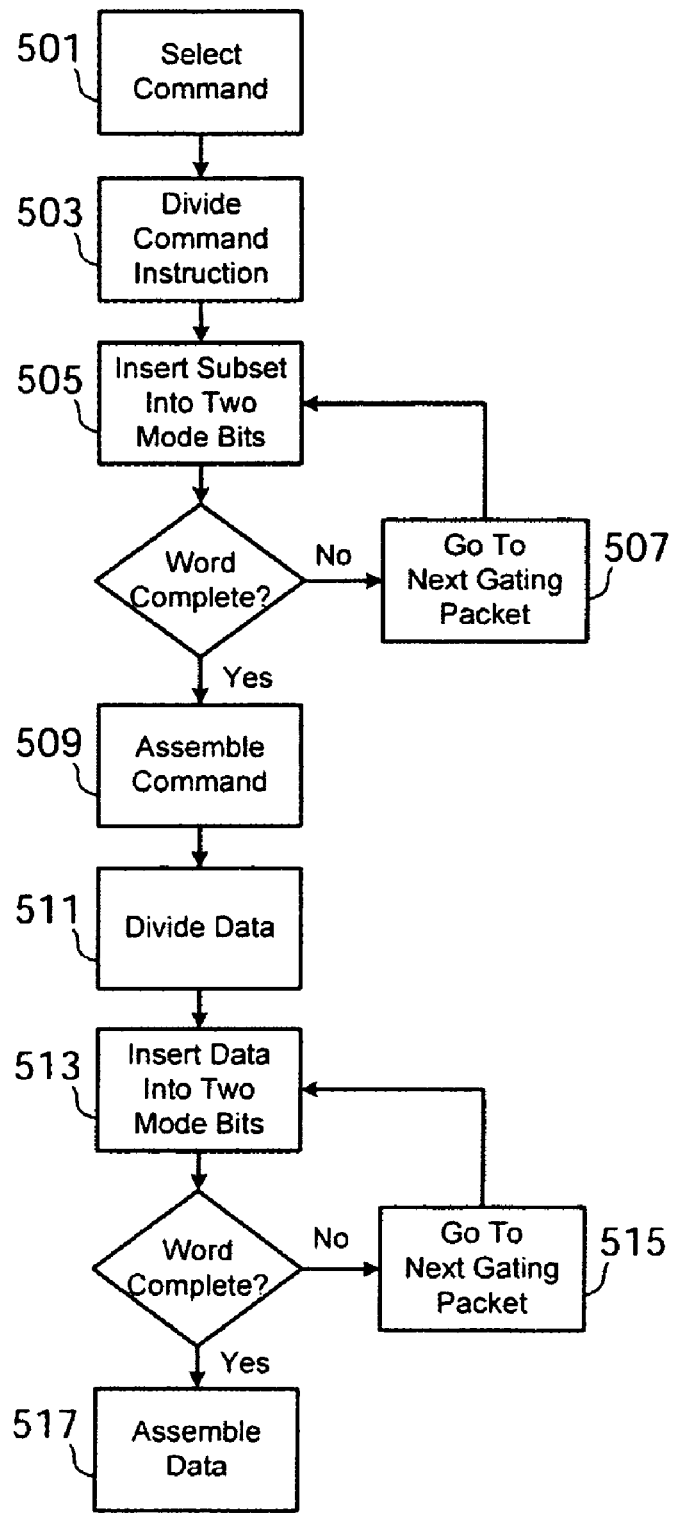
FIG. 5 illustrates an exemplary process of requesting and receiving fault and/or waveform data from a power cell.

The process described in FIG. 5 and above also may apply to obtain waveform data from the memory portion of the cell that holds waveform data. This data, such as current, voltage and phase data, can also be used to predict the potential for a fault to occur. The system or an operator may then take action, such as shut down the cell, bypass a cell, change operating conditions, or dispatch a technician, to prevent or reduce the chance of occurrence of a fault in the cell.

By including fault and/or waveform data within multiple gating signal packets, the system may request and collect data from the cell without interrupting the normal flow of command signals to and from the cell. Thus, a rich array of data may be collected in various embodiments, while maintaining a normal level of cell control.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

What is claimed is:

1. A method of monitoring a power delivery system, comprising:
   delivering a gating signal racket to a component of a power delivery system, wherein the delivered packet includes a plurality of bits that command operation of one or more devices within the component, and wherein the packet includes one or more bits that contain a subset of a command to request a data point including stored data from a component memory; and
   receiving a gating signal packet from the component wherein the received packet includes a plurality of bits that correspond to the status of one or more devices within the component, and wherein the packet also includes one or more bits that contain a subset of the stored data that was retrieved from the component memory.

2. The method of claim 1, further comprising:
   repeating the receiving until a plurality of gating signal packets are received, wherein the plurality of received gating signal packets collectively contain the stored data; and
   assembling the subsets of the data point into the stored data.

3. The method of claim 1, further comprising:
   repeating the delivering until a plurality of gating signal packets are delivered, wherein the plurality of gating signal packets collectively contain the command; and
   assembling the subsets of the command into the command.

4. The method of claim 1, wherein the stored data comprises fault data.

5. The method of claim 4, wherein the fault data comprises a fault code.

6. The method of claim 5, wherein the fault data further comprises a time code or a device identifier.

7. The method of claim 4, wherein the stored data comprises waveform information.

8. The method of claim 7, wherein the waveform information comprises current data, temperature data, voltage data or phase data.

9. The method of claim 1, wherein the one or more bits that contain a subset of stored data are mode bits of the gating signal packet.

10. The method of claim 2, further comprising using the assembled stored data to determine a component fault diagnosis.

11. The method of claim 2, wherein the packets also include a plurality of bits corresponding to data that is predictive of failure of a component, and the method also includes delivering a control command to the power cell based on the predictive data.

12. A method of operating a power cell, comprising:
  delivering a gating signal packet to the power cell, wherein the delivered packet includes a plurality of bits that command operation of one or more devices within the cell, and wherein the packet includes one or more bits that contain a subset of a command to request a data point including stored data from a cell memory;
  receiving a gating signal packet from the power cell, wherein the received packet includes a plurality of bits that correspond to the status of one or more devices within the cell, and wherein the packet also includes one or more bits that contain a subset of stored data that was retrieved from the cell memory;
  repeating the receiving until a plurality of gating signal packets are received, wherein the plurality of received gating signal packets collectively contain the stored data; and
  assembling the subsets of the data point into the stored data.

13. The method of claim 12, further comprising, before the receiving:
  repeating the delivering until a plurality of gating signal packets are delivered, wherein the plurality of gating signal packets collectively contain the command; and
  assembling the subsets of the command into the command.

14. The method of claim 12, wherein the stored data comprises a fault code and one or both of a time code or a device identifier.

15. The method of claim 12, wherein the stored data comprises current data, temperature data, voltage data or phase data.

16. The method of claim 12, further comprising using the assembled stored data to determine a power cell fault diagnosis.

17. A method of monitoring a power cell, comprising:
  delivering a gating signal packet to a power cell, wherein the delivered packet includes a plurality of bits that command operation of one or more devices within the cell, and wherein the packet includes one or more bits that contain a subset of a command to request a data point;
  repeating the delivering until a plurality of gating signal packets are delivered, wherein the plurality of gating signal packets collectively contain the command;
  assembling the subsets of the command into the command;
  receiving a gating signal packet from the power cell in response to the command, wherein the received packet includes a plurality of bits that correspond to the status of one or more devices within the cell, and wherein the packet also includes one or more bits that contain a subset of stored data that was retrieved from a cell memory;
  repeating the receiving until a plurality of gating signal packets are received, wherein the plurality of received gating signal packets collectively contain the stored data; and
  assembling the subsets of the stored data into the stored data.

18. The method of claim 17, wherein:
  the assembled stored data comprises a halt code or waveform data.

19. The method of claim 18, further comprising using the assembled stored data to determine a power cell fault diagnosis.

* * * * *

UNITED STATES PATENT AND TRADEMARK OFFICE
CERTIFICATE OF CORRECTION

PATENT NO. : 7,599,818 B2  
APPLICATION NO. : 11/515292  
DATED : October 6, 2009  
INVENTOR(S) : Bousfield, III et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this

Twenty-eighth Day of September, 2010

David J. Kappos  
*Director of the United States Patent and Trademark Office*